(12) United States Patent
Kitahara et al.

(10) Patent No.: US 6,331,358 B1
(45) Date of Patent: Dec. 18, 2001

(54) WET FRICTION MATERIAL AND PROCESS FOR PRODUCING THE SAME

(75) Inventors: Shun Kitahara; Fumimasa Muramatsu; Shigeki Umezawa, all of Shizuoka (JP)

(73) Assignee: NSK-Warner Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/261,203

(22) Filed: Mar. 3, 1999

(30) Foreign Application Priority Data

Mar. 3, 1998 (JP) .................................................. 10-050923

(51) Int. Cl.$^7$ ................................. B32B 5/16; F16D 11/00
(52) U.S. Cl. ........................ 428/447; 162/135; 162/142; 162/145; 162/146; 162/165
(58) Field of Search ..................................... 162/135, 142, 162/145, 146, 165; 428/446, 447

(56) References Cited

U.S. PATENT DOCUMENTS

| | | | |
|---|---|---|---|
| 4,262,788 | * | 4/1981 | Yamamoto et al. ............ 192/107 M |
| 5,453,317 | | 9/1995 | Yesnik ................................. 428/283 |

FOREIGN PATENT DOCUMENTS

| | | |
|---|---|---|
| 55-92738 | 7/1980 | (JP) . |
| 60-28484 | 2/1985 | (JP) . |
| 61-192711 | 8/1986 | (JP) . |
| 7-173301 | 7/1995 | (JP) . |
| 7-197016 | 8/1995 | (JP) . |

* cited by examiner

Primary Examiner—D. S. Nakarani
(74) Attorney, Agent, or Firm—Sughrue, Mion, Zinn, Macpeak & Seas, PLLC

(57) ABSTRACT

A wet friction material is mainly composed of a fiber base material, a filler, an friction adjusting agent and a thermosetting resin. The wet frictional material is prepared by impregnating with a liquid thermosetting resin a paper formed by mixing a paper-forming solid thermosetting resin with a fiber base material as at least a part of filler, and then applying heat to the paper so that it is hardened. The solid thermosetting resin is preferably a phenol resin. The liquid thermosetting resin is preferably made of a silicone resin represented by the following average composition formula and the amount of trifunctional unit monomers ($RSiO_{3/2}$ in which R represents a substituted or unsubstituted monovalent hydrocarbon group) in monomers constituting said silicone resin is from 40 to 100 mol-%:

$$(R^1)_a(OR^2)_b SiO_{(4-a-b)/2}.$$

10 Claims, 2 Drawing Sheets

INTERNALLY ADDED AMOUNT OF POWDERED PHENOL RESIN, %
(BASED ON TOTAL WEIGHT OF RESINS)

| POWDERED PHENOL RESIN AND SILICONE POWDER INTERNALLY ADDED PAPER TYPE (SAMPLE 9) | PRESENT INVENTION (SAMPLE 6) |

WET FRICTION MATERIAL AND PROCESS FOR PRODUCING THE SAME

BACKGROUND OF THE INVENTION

1. Field of the Invention

The present invention relates to a wet friction material and a process for producing the same. More particularly, the present invention relates to a friction material for clutch for use in automatic transmission, particularly a wet friction material suitable for use in an oily liquid, and a process for producing the same.

2. Description of the Related Art

As clutches for use in transmission for vehicle such as automobile and train there are widely used friction clutches. The friction material to be incorporated in this kind of friction clutches is normally obtained by a process which comprises subjecting a fiber base material such as natural pulp fiber, organic synthetic fiber and inorganic fiber, a filler such as diatomaceous earth and cashew resin and a friction adjusting agent to wet paper making process to form a paper, impregnating the paper with a thermosetting resin such as phenol resin, and then compression-molding the paper under heating.

These friction materials can be divided into two types, i.e., dry friction material which is used in dry form and wet friction material which is used in an oily liquid. Friction materials suited for respective purposes are developed.

As the thermosetting resin to be incorporated in these friction materials, there are used various thermosetting resins. A phenol resin is widely used from the standpoint of heat resistance, abrasion resistance, handleability, cost, etc. As such phenol resins, there are used phenol resins which has been modified with various resins to improve various properties. There are many kinds of such modified phenol resins. As one of these modified phenol resins, there is proposed a phenol resin which is obtained by bonding a straight-chain organopolysiloxane to a novolak phenol resin to exhibit improvements in elasticity, tension transmission characteristics and tensile strength (JP-A-55-92738 (The term "JP-A" as used herein means an "Unexamined Japanese Patent Publication (Kokai)")).

However, such a phenol resin modified with a straight-chain organopolysiloxane is disadvantageous in that it exhibits a lowered softening point or a reduced stability of organopolysiloxane. In order to obtain a binder that provides better heat resistance and abrasion resistance, a proposal was made to use as a binder a compound mainly composed of a phenol resin, as one of the foregoing modified phenol resins, modified with an organopolysiloxane containing $R^1SiO_{1.5}$ unit (in which $R^1$ represents the same or different $C_{1-8}$ substituted or unsubstituted monovalent hydrocarbon group) and/or $SiO_2$ unit to produce a friction material (JP-A-61-192711).

Further, it is proposed in a clutch facing comprising as constituents a fibrous material, an abrasion-resistant powder, a metal wire or metal powder and a binder that as such a binder there be used a silicone resin in an amount of from 0.1 to 10% by weight based on the weight of the clutch facing in combination with a conventional binder such as phenol-formaldehyde resin, melamine-formaldehyde resin, melamine-phenol-formaldehyde resin, SBR, NBR and natural rubber (JP-A-60-28484).

In accordance with the arrangement thus proposed, a clutch facing which can hardly absorb moisture can be obtained. However, this proposal says that the silicone resin to be used for this purpose is not specifically limited so far as it can exert an effect of preventing moisture absorption. In some detail, only dimethylsiloxane silicone resins are exemplified in the above cited patent application. There is no detailed consideration of the technical content.

Then, it has been proposed a wet friction material comprising a thermosetting synthetic resin made of a silicone resin represented by the following average composition formula, the amount of trifunctional unit monomers ($RSiO_{3/2}$ in which R represents a substituted or unsubstituted monovalent hydrocarbon group) in monomers constituting the silicone resin being from 40 to 100 mol-% (JP-A-7-197016):

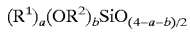

$$(R^1)_a(OR^2)_b SiO_{(4-a-b)/2}$$

wherein $R^1$ represents a substituted or unsubstituted monovalent hydrocarbon group; $R^2$ represents a hydrogen atom or $C_{1-10}$ organic group; and the suffixes a and b represent a positive number satisfying the relationships $0.2 \leq a \leq 1.8$ and $0 < b \leq 1.9$, as a wet friction material which can provide a wet friction material having an excellent heat endurance and a high torque transmission capacity to meet the demand for the control over slip in friction clutch or the reduction of friction in ATF (automatic transmission fluid) in order to reduce fuel cost and improve feeling during transmission in the modern automobile automatic transmission from the standpoint of energy problem or environmental problem.

The wet friction material thus developed exhibits an excellent heat resistance, a high durability and a high torque transmission capacity as expected. However, if the foregoing wet friction material containing a silicone resin is produced by the conventional production process which comprises subjecting a fiber based material and a filler in admixture to wet paper making process to form a paper, impregnating the paper with a thermosetting resin, and then compression-molding the paper under heating, the resulting flexibility becomes too great due to the characteristics of the foregoing silicone resin. As a result, the wet friction material thus produced occasionally leaves something to be desired in shearing strength, peeling life, etc.

Even if the foregoing production process is conducted by mixing a phenol resin as a thermosetting resin with a silicone resin in an attempt to attain both the desired strength and flexibility for wet friction material, a phenol resin and a silicone resin can hardly be mixed with each other as generally known.

A production process has then been proposed which comprises mixing a powdered phenol resin with a powdered silicone resin, a filler and a fiber base material to obtain a paper, and then applying heat to the paper to obtain a wet friction material (JP-A-7-173301). This wet friction material is obtained by mixing the foregoing powdered resins. By applying heat to the paper thus obtained, these resins harden. This production process involves no step of impregnating the paper with these resins, making it possible to avoid complicatedness in mixing uniformly two liquid resins.

However, a wet friction material having an excellent shearing strength and heat resistance can be obtained by the conventional production process which comprises subjecting a fiber based material and a filler in admixture to wet paper making process to form a paper, impregnating the paper with a thermosetting resin, and then compression-molding the paper under heating rather than the foregoing proposed production process.

SUMMARY OF THE INVENTION

It is an object of the present invention to obtain a wet friction material having an excellent heat resistance, a high torque capacity, a high shearing strength and a prolonged peeling life which can be produced by a simple production process.

According to the present invention, a wet friction material comprising a fiber base material, a filler, a friction adjusting agent and a thermosetting resin. The wet friction material is prepared by mixing a paper-forming solid thermosetting resin with a fiber base material as at least a part of filler; impregnating said paper with a liquid thermosetting resin; and applying heat to said paper so as to be hardened.

In accordance with the present invention, the use of the foregoing production process makes it possible to obtain an excellent wet friction material having an excellent heat resistance, a great torque capacity, a high shearing strength and a prolonged peeling life.

Further, the present invention can exert an effect of prolonging the life of friction material without deteriorating the dynamic friction coefficient over an extended period of time.

Moreover, the wet friction material according to the present invention exhibits a good initial drape and hence shows a predetermined friction from the initial stage and thus requires no treatment for drape such as sand paper treatment.

DETAILED DESCRIPTION OF THE INVENTION

Figure 1:
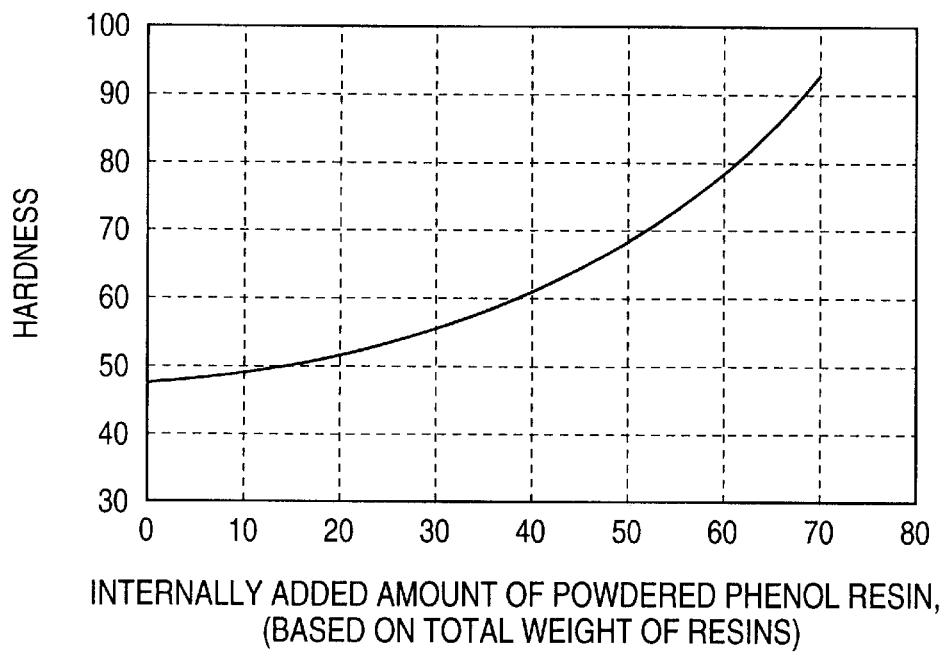
FIG. 1 is a graph illustrating the relationship between the internally added amount of powdered phenol resin and the hardness of the wet friction material of the present invention obtained in Example 1.
Figure 2:
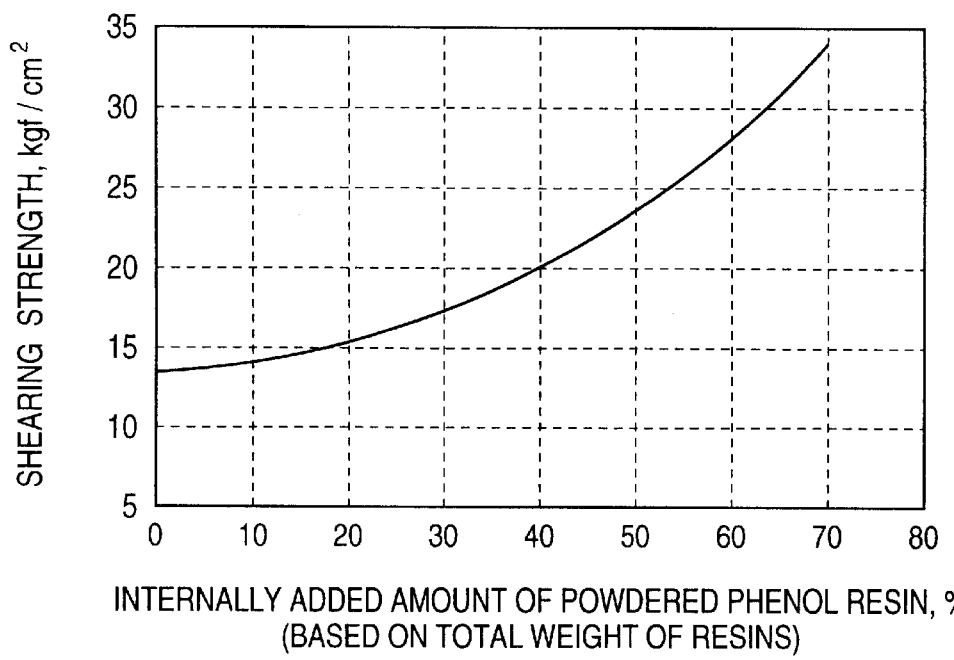
FIG. 2 is a graph illustrating the relationship between the internally added amount of powdered phenol resin and the shearing strength of the wet friction material of the present invention obtained in Example 1.

The present invention will be described in detail as follows.

As the fiber base material to be incorporated in the wet friction material of the present invention, there is used a fiber base material which has heretofore been used in friction materials such as natural pulp fiber, organic synthetic fiber and inorganic fiber. As the filler and the friction adjusting agent, there is used a material which has heretofore been used such as diatomaceous earth and cashew resin.

The paper-forming solid thermosetting resin to be mixed with the fiber base material to be used in the present invention needs to harden to bind the fiber base material or the like upon heating. Specific examples of the paper-forming solid thermosetting resin include various resins such as phenol resin and epoxy resin. Mostly preferred among these resins is phenol resin. As the phenol resin, there is preferably used a phenol resin containing an unreacted phenol incorporated therein in some amount, e.g., from 1 to 3% to harden upon heating. For example, a novolak phenol resin containing free phenol can be used.

Specific examples of the novolak phenol resin include novolak phenol-formaldehyde resin, and novolak phenol-hexamethylene resin.

The foregoing paper-forming solid thermosetting resin is preferably in fine form such as powder, particle and fiber from the standpoint of ease of paper making. The particle size of the paper-forming solid thermosetting resin is preferably not more than 100 $\mu$m. The lower limit of the particle size of the paper-forming solid thermosetting resin is determined by the production cost of particle and thus is not specifically limited. However, if the particle size of the paper-forming solid thermosetting resin is too small, the resin can hardly be handled. If used as a water-dispersible particulate resin to be dispersed in water, the paper-forming solid thermosetting resin preferably has a particle size of from about 1 to 2 $\mu$m.

Referring to the mixing proportion of the various materials, the amount of the fiber base material, the filler and the paper-forming solid thermosetting resin to be used normally falls within the range of from 15 to 60% (hereinafter by weight), from 15 to 60% and from 2 to 40%, respectively. In particular, the amount of the paper-forming solid thermosetting resin to be used is preferably varied depending on the relationship with the shape of the solid matter or the kind of the thermosetting resin. For example, it is preferably from 3 to 30%, more preferably from 5 to 30%.

Further, the amount of the foregoing paper-forming solid thermosetting resin and the impregnating liquid thermosetting resin to be used should be determined taking into account the total amount of the resins from the standpoint of the mechanism that both the two thermosetting resins harden at the final heating step to bind the fiber base material, etc. It is preferred that the proportion of the resin components constituting the wet friction material be from 15 to 55%, preferably from 35 to 45% based on the total weight of the various components.

The amount of the paper-forming solid thermosetting resin to be used is from 10 to 70%, preferably from 30 to 50% based on the total weight of the resins used because the paper-forming solid thermosetting resin hardens at the final heating step to bind the fiber base material, etc. and is incorporated close to the fiber base material to show a great binding power. It may be also determined taking into account the kind and amount of the liquid thermosetting resin with which the paper is impregnated.

The production process of the present invention involves blending the paper-forming solid thermosetting resin at the step of forming a paper, followed by the impregnation of the paper with the liquid thermosetting resin. In the paper thus formed, the liquid thermosetting resin is disposed around the solid thermosetting resin. Thus, it is thought that when the paper is heated to undergo hardening, the internal solid thermosetting resin binds fiber base material particles to give a raised shearing strength while the disposition of the liquid thermosetting resin, e.g., silicone resin, around the solid thermosetting resin makes it possible to give a sufficiently enhanced resistance to external heat.

The present invention not only gives solution to the problem that a liquid phenol resin and a liquid silicone resin cannot be used in admixture for impregnation but also makes it possible to attain a structure which acts to internally enhance the shearing strength and externally give a sufficiently enhanced heat resistance.

Examples of the liquid thermosetting resin with which the paper is impregnated in the present invention include various resins such as silicone resin and flexible modified phenol resin (e.g., oil-modified phenol resin). The most preferable resin is silicone resin. Particularly preferred among the silicone resin is the following compounds.

These silicone resins are represented by the following average composition formula:

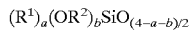
$(R^1)_a(OR^2)_b SiO_{(4-a-b)/2}$

The amount of trifunctional unit monomers ($RSiO_{3/2}$ in which R represents a substituted or unsubstituted monovalent hydrocarbon group) in monomers constituting the silicone resin is from 40 to 100 mol-%. In the foregoing formula, $R^1$ represents a substituted or unsubstituted monovalent hydrocarbon group, $R^2$ represents a hydrogen atom or $C_{1-10}$ organic group, and the suffixes a and b represent a positive number satisfying the relationships $0.2 \leq a \leq 1.8$ and $0 < b \leq 1.9$.

In the foregoing formula, $R^1$ represents a substituted or unsubstituted monovalent hydrocarbon group preferably having from 1 to 10 carbon atoms. Examples of such a monovalent hydrocarbon group include alkyl groups such as methyl group, ethyl group, propyl group, butyl group and decyl group, aryl groups such as phenyl group and tolyl group, alkenyl groups such as vinyl group and allyl group, and substituted alkyl groups such as trifluoropropyl group, chloromethyl group, chloropropyl group and glycidoxypropyl group. Preferred among these monovalent hydrocarbon groups are methyl group and phenyl group from the industrial standpoint of view. $R^1$ may be a mixture of two or more of the foregoing substituents. $R^2$ represents a hydrogen atom or $C_{1-10}$ organic group. Examples of such a group include hydrogen atom, alkyl groups such as methyl group, ethyl group, propyl group, isopropyl group and isobutyl group, alkenyl groups such as vinyl group, allyl group and isopropenyl group, and oxim residues such as butylene amino group and isobutylene amino group. $R^2$ is a mixture of two or more of the foregoing substituents.

In the foregoing formula, the suffixes a and b represent a positive number satisfying the relationships $0.2 \leq a \leq 1.8$ and $0 < b < 1.9$. The amount of trifunctional unit monomers ($RSiO_{3/2}$ in which R represents a substituted or unsubstituted monovalent hydrocarbon group) in the constituents of the silicone resin to be used in the present invention needs to be from 40 to 100 mol-%. R represents a substituted or unsubstituted monovalent hydrocarbon group. Among silicone resins which can be used in the present invention, those containing methyl group in an amount of from 20 to 100 mol-% have particularly excellent durability. As compared with the conventional phenol resin, the friction material according to the present invention exhibits a high friction coefficient and a good initial drape and thus can form a wet friction clutch having a high durability.

In order to further enhance the durability of the friction material, the foregoing organic substituent $R^1$ is preferably methyl group in an amount of from 20 to 100 mol-%. $R^1$ may be an alkyl group such as ethyl group. $R^1$ is preferably a methyl group. $R^1$ may also be a monovalent aromatic group such as phenyl group.

Further, the molecular weight of the foregoing silicone resin is preferably from $10^3$ to $10^6$. In general, the content of the foregoing silicone resin in the wet friction material of the present invention is preferably from 15 to 55% by weight. The content of the foregoing silicone resin in the wet friction material of the present invention may fall below or exceed the above defined range.

The wet friction material according to the present invention exhibits an enhanced heat resistance, if it contains as the foregoing silicone resin one having a large amount of methyl group but a small amount of phenyl group as the foregoing organic substituent $R^1$.

Further, the wet friction material according to the present invention also exhibits an enhanced heat resistance, if it contains as the foregoing silicone resin one having a large amount of the foregoing trifunctional unit.

From these standpoints of view, the wet friction material according to the present invention preferably has an optimum formulation to meet the requirements.

A silicone resin has a siloxane bond (Si-O-Si) in its main chain. This siloxane bond can easily rotate because the bond length between silicon atom and oxygen atom is great and the electron density in the bond is low. Thus, a silicone resin exhibits sufficient flexing characteristics and is flexible. A wet friction material including such a silicone resin incorporated therein exhibits a smoothened and flexible surface that comes in contact with the opposite friction plate at an increased area, making it possible to secure a high torque capacity.

The Si—O bond energy in the siloxane bond is as very high as 106 Kcal/mol. Further, the Si—O bond is stable as compared with C—C bond (81 Kcal/mol). Because of its high bond energy, the silicone resin can undergo deterioration such as decomposition and discoloration with difficulty even when preserved at high temperatures over an extended period of time and is stable to frictional heat developed on the friction sliding surface, making it possible to inhibit carbonization, glazing or the like. Thus, the silicone resin can remarkably enhance the heat endurance of wet friction materials.

On the other hand, the silicone resin exhibits a high affinity for the inorganic material incorporated in the base material paper. Even when heated to a temperature of not lower than its decomposition temperature, the silicone resin forms Si—O bond with the inorganic material to give a structure more stable to heat, rendering itself durable at temperatures as high as not lower than 500° C.

Moreover, the flexibility of the silicone resin optimizes the strain characteristics of the friction material. Thus, the friction coefficient $\mu$ of the friction material can be stabilized and kept higher than at the initial cycle. Accordingly, an easily usable wet friction material which can lessen transmission shock and provide easy tuning can be provided. Conventionally, it is necessary that wet friction materials be polished with sand paper or the like prior to use to exhibit predetermined friction characteristics from the beginning of use. The wet friction material according to the present invention exhibits such characteristics from the beginning of use and hence a good initial drape and thus requires no polishing for providing drape.

EXAMPLES

The present invention will be further described in the following examples, but the present invention should not be construed as being limited thereto.

Example 1

| Natural pulp, organic synthetic fiber | 40% by weight |
|---|---|
| Cellulose fiber | 25% by weight |
| Polyamide fiber | 15% by weight |
| Friction adjusting agent/filler | 30% by weight |
| Cashew dust | 10% by weight |
| Diatomaceous earth | 20% by weight |

-continued

| | |
|---|---|
| Powdered phenol resin<br>(particle diameter: not more than 100 μm;<br>material: novolak phenol resin) | 15% by weight |
| Liquid silicone resin<br>(Average composition formula:<br>$(CH_3)_{1.30}SiO_{1.26}(OH)_{0.12}(OCH_3)_{0.06}$<br>Trifunctional unit ($RSiO_{3/2}$): 70 mol-%<br>Methyl group: 100 mol-% | 15% by weight |

The foregoing natural pulp, organic synthetic fiber, friction adjusting agent/filler and powdered phenol resin were mixed at the foregoing ratio to form a slurry which was then made into a paper. The paper thus made was then dried to prepare a paper having a thickness of 0.7 mm. The paper thus prepared was impregnated with the foregoing liquid silicone resin, dried, and then kept under a pressure of 200 kg/cm² in a mold which had been heated to a temperature of 170° C. for 30 minutes so that it was bonded to a disc plate made of metal plate to obtain a wet friction material (Sample 6) having a diameter of 130 mm and a thickness of 2.3 mm.

The wet friction material thus obtained was then measured for hardness and shearing strength. As a result, the sample was found to have a hardness of 69 and a shearing strength of 24 kgf/cm².

Since the "hardness" of a wet friction material cannot be accurately represented by an ordinary indication of hardness, the following remodelled version of measuring method was employed.

For the measurement of hardness, a circle (flat surface) having a diameter of 8.9 mm was used as a penetrator for Rockwell hardness tester was used. In some detail, an initial load of 10 kgf was applied to the sample. The point which had thus been indented was defined to be an origin. Subsequently, a load of 150 kgf was applied to the sample at the origin for 15 seconds. The sample was then released for 15 seconds. The recovered position from the origin was then measured.

In the graph below, one graduation is 2 μm, and the value of 100 indicates the origin. Thus, the data thus obtained indicates the recovered position rather than the deformed position given when a load is applied.

Example 2

A wet friction material was produced in the same manner as in Example 1 except that the content of powdered phenol resin in the total amount of resins (also referred to as "internally added amount of powdered phenol resin") was changed to examine the effect of the content of powdered phenol resin.

The internally added amount of powdered phenol resin in the sample is set forth in Table 1. Sample 6 is according to Example 1.

The wet friction material samples thus obtained were then measured in the same manner as in Example 1. The relationship between the internally added amount of powdered phenol resin and the hardness of the sample determined from the measurements is shown in FIG. 1. The relationship between the internally added amount of powdered phenol resin and the shearing strength of the sample is shown in FIG. 1.

| Sample No. | Silicone resin (parts by weight) | Phenol resin (parts by weight) | Internally added amount of phenol resin (%) |
|---|---|---|---|
| 1 | 30 | 0 | 0 |
| 2 | 27 | 3 | 10 |
| 3 | 24 | 6 | 20 |
| 4 | 21 | 9 | 30 |
| 5 | 18 | 12 | 40 |
| 6 | 15 | 15 | 50 |
| 7 | 12 | 18 | 60 |
| 8 | 9 | 21 | 70 |

Sample No. 1: Comparative Example
Sample No. 2~8: Example of the present invention Comparative Example 1

In order to compare the present invention with the case where a wet friction material is prepared by a process which comprises forming a paper in the same manner as mentioned above, allowing a powdered silicone resin to be incorporated in the paper with a powdered phenol resin without having the paper impregnated with a liquid silicone resin which would be otherwise thermoset, and then immediately allowing the paper to harden, the following test was conducted.

| | |
|---|---|
| Natural pulp, organic synthetic fiber | 40% by weight |
| Cellulose fiber | 25% by weight |
| Polyamide fiber | 15% by weight |
| Friction adjusting agent/filler | 30% by weight |
| Cashew dust | 10% by weight |
| Diatomaceous earth | 20% by weight |
| Powdered phenol resin<br>(particle diameter: not more than 100 μm;<br>material: novolak phenol resin) | 15% by weight |
| Powdered silicone resin<br>(particle diameter: not more than 100 μm;<br>material: polydimethylsiloxane silicone) | 15% by weight |

A paper was made from a slurry containing the foregoing natural pulp, organic synthetic fiber, friction adjusting agent, filler, powdered phenol resin and powdered silicone resin at the foregoing ratio. The paper thus made was dried, and then kept under a pressure of 200 kg/cm² in a mold which had been heated to a temperature of 170° C. for 30 minutes so that it was bonded to a disc plate made of metal plate to obtain a wet friction material having a diameter of 130 mm and a thickness of 2.3 mm. The wet friction material thus obtained was then used as Sample 9.

Comparative Example

Figure 3:
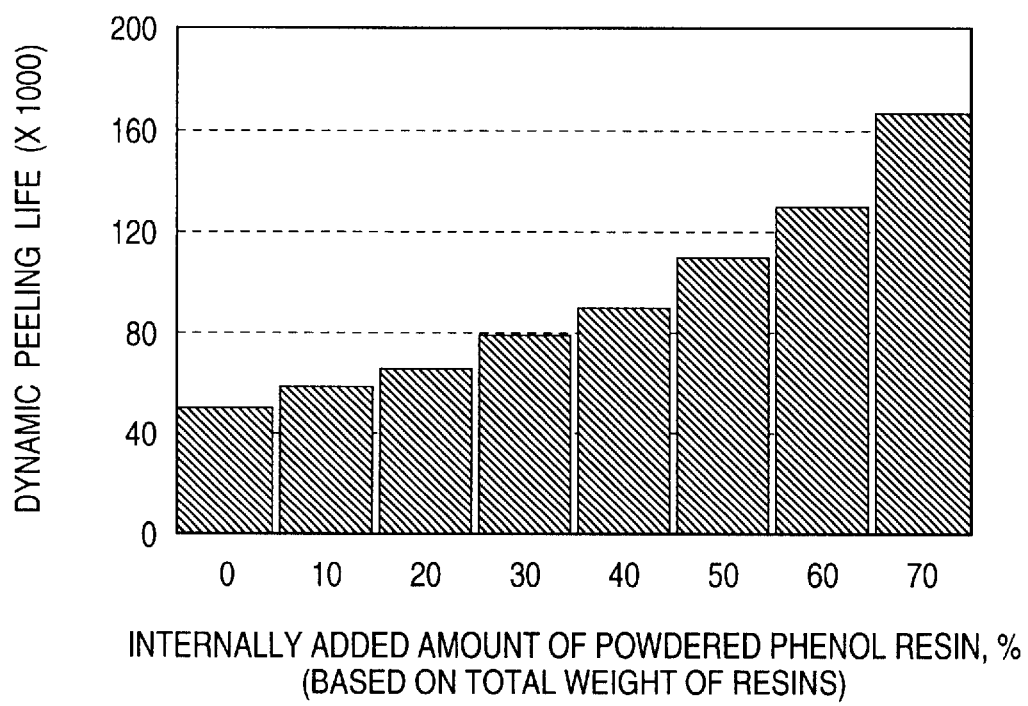
FIG. 3 is a graph illustrating the relationship between the internally added amount of powdered phenol resin and the dynamic peeling life of the friction materials of the present invention obtained in Examples 1 and 2.
Figure 4:
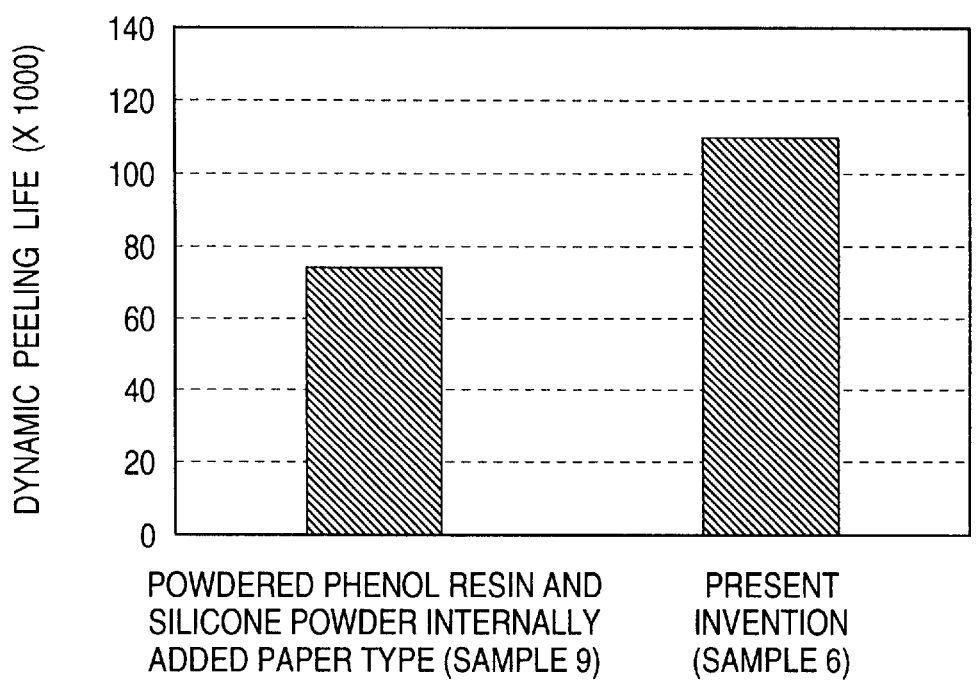
FIG. 4 is a graph illustrating the comparison of the dynamic peeling life of the friction materials of Example 1 of the present invention and Comparative Example 1 by different production processes.

The friction material samples obtained in Examples 1 and 2 and Comparative Example 1 were then subjected to friction test. In the friction test, these samples were measured for dynamic peeling life with respect to the number of friction. The measurements are shown in FIGS. 3 and 4. FIG. 3 is a graph illustrating the relationship between the internally added amount of powdered phenol resin and the dynamic peeling life of Samples 1 to 8. FIG. 4 is a graph of the measurements of dynamic peeling life of Sample 6 and Sample 9 (Comparative Example 1) illustrating the difference in dynamic peeling life between different production processes.

What is claimed is:

1. A wet friction material comprising:
   a fiber base material;
   a filler;
   a friction adjusting agent; and
   a thermosetting resin;
   wherein said wet friction material is prepared by mixing a paper-forming solid thermosetting resin with a fiber base material as at least a part of a filler to form a paper, impregnating said paper with a liquid thermosetting resin, and applying heat to said paper so as to be hardened, wherein at least a part of said liquid thermosetting resin is made of a silicone resin represented by the following average composition formula, and the amount of trifunctional unit monomers, $RSiO_{3/2}$ in which R represents a monovalent hydrocarbon group, in monomers constituting said silicone resin is from 40 to 100 mol %:

$$(R^1)_a(OR^2)_b SiO_{(4-a-b)/2}$$

wherein $R^1$ represents a monovalent hydrocarbon group, $R^2$ represents a hydrogen atom or $C_{1-10}$ organic group; and the suffixes a and b represent a positive number satisfying the relationships $0.2 \leq a \leq 1.8$ and $0 < b \leq 1.9$.

2. The wet friction material according to claim 1, wherein the total amount of said thermosetting resins in the wet friction material is from 15 to 55% by weight.

3. The wet friction material according to claim 1 or 2, wherein the amount of said solid thermosetting resin in the total amount of thermosetting resins is from 10 to 70% by weight.

4. The wet friction material according to claim 3, wherein said solid thermosetting resin is one of a phenol resin or an epoxy resin.

5. The wet friction material according to claim 1, wherein said fiber base material is selected from the group consisting of a natural pulp fiber, an organic synthetic fiber and an inorganic fiber.

6. The wet friction material according to claim 1, wherein said filler is diatomaceous earth and said friction adjusting agent is cashew resin.

7. The wet friction material according to claim 1, wherein said solid thermosetting resin is one of a phenol resin or an epoxy resin.

8. A wet friction material according to claim 1, wherein a particle size of said solid thermosetting resin is not more than 100 μm.

9. The wet friction material according to claim 1, wherein said liquid thermosetting resin is one of an oil-modified phenol resin or a silicon resin.

10. The wet friction material according to claim 1, wherein said monovalent hydrocarbon group is selected from the group consisting of a methyl group, an ethyl group, a propyl group, a butyl group, a decyl group, a phenyl group, a tolyl group, a vinyl group, an allyl group, a trifluoropropyl group, a chloromethyl group, a chloropropyl group, a glycidoxypropyl group and mixtures thereof.

* * * * *